Sept. 16, 1969 R. A. WHITLOCK 3,467,255
REGENERANT CONTROL APPARATUS
Filed Nov. 21, 1967 3 Sheets-Sheet 1
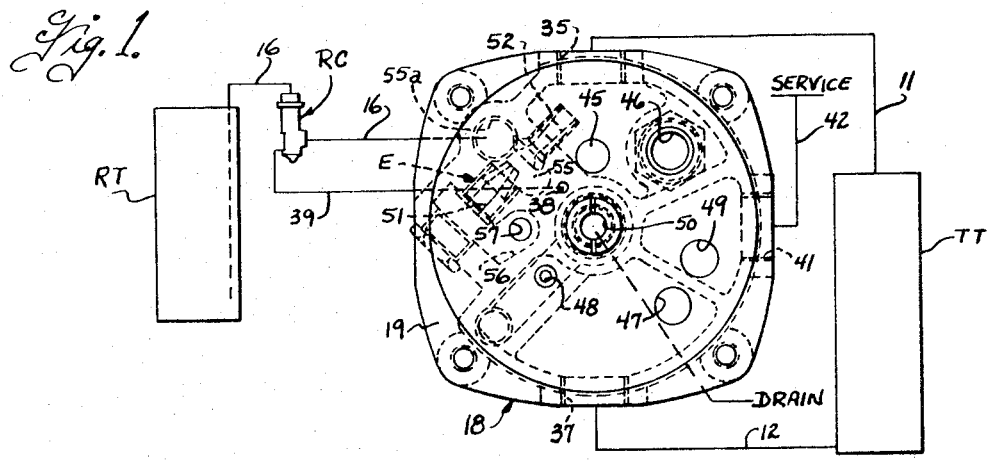
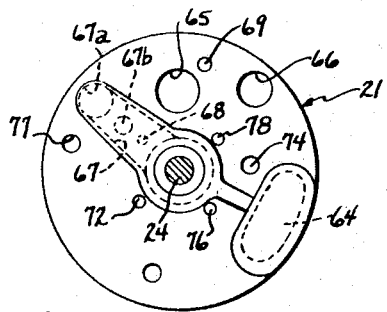
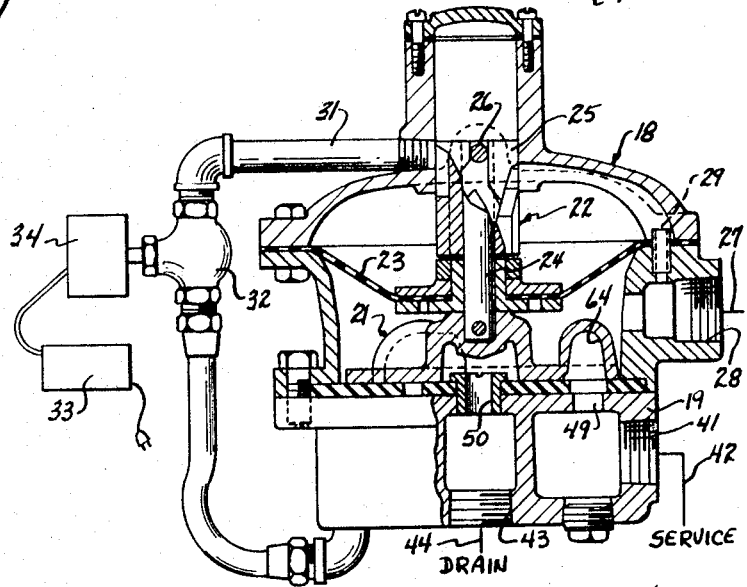
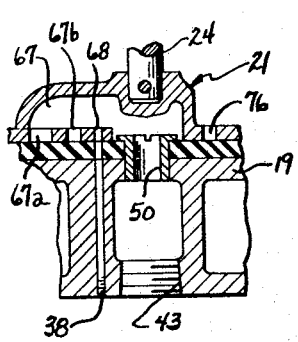
Inventor
Robert A. Whitlock
By
McCanna, Morsbach & Pillote
Attorneys

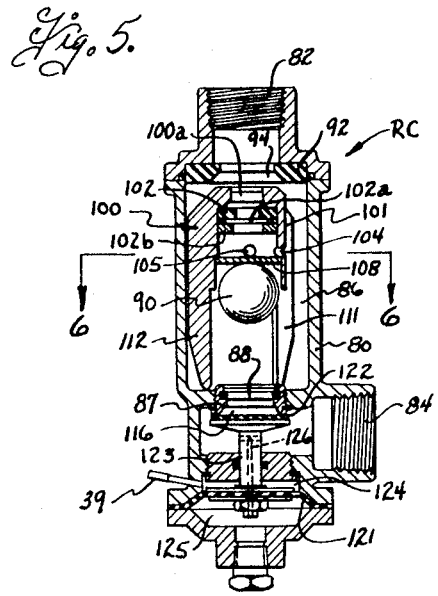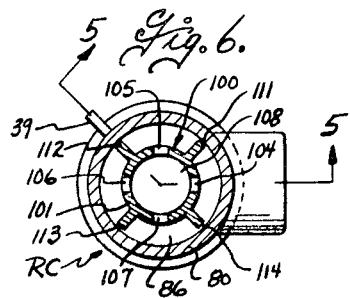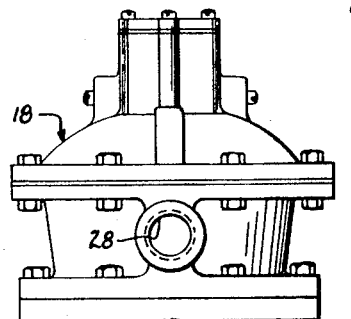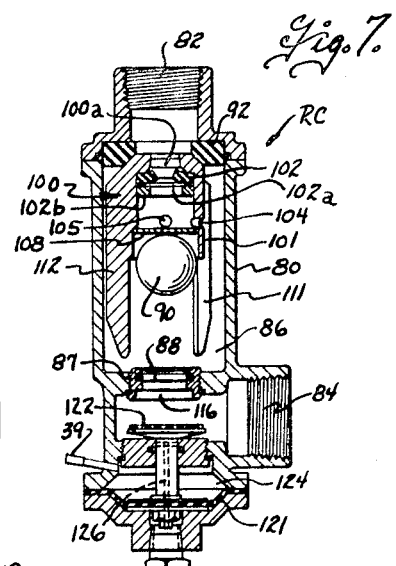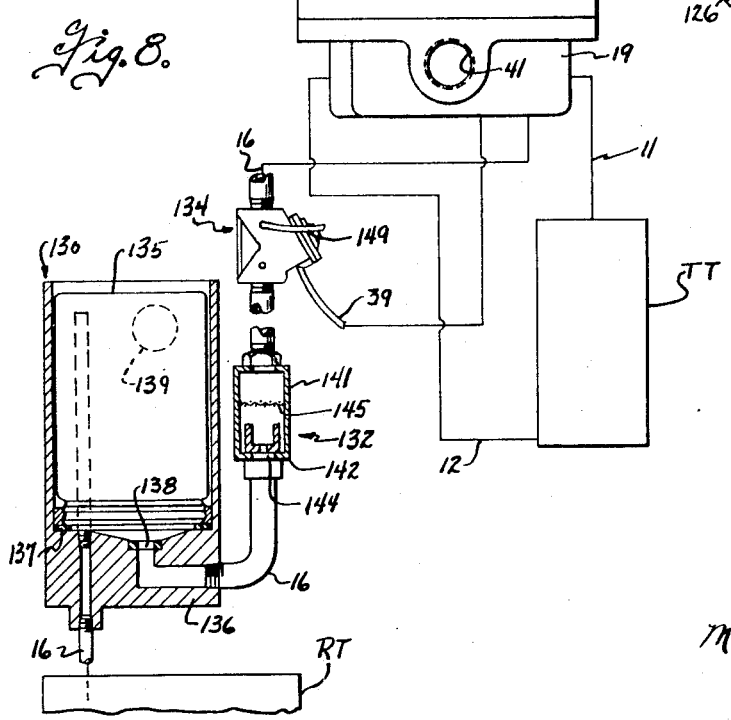

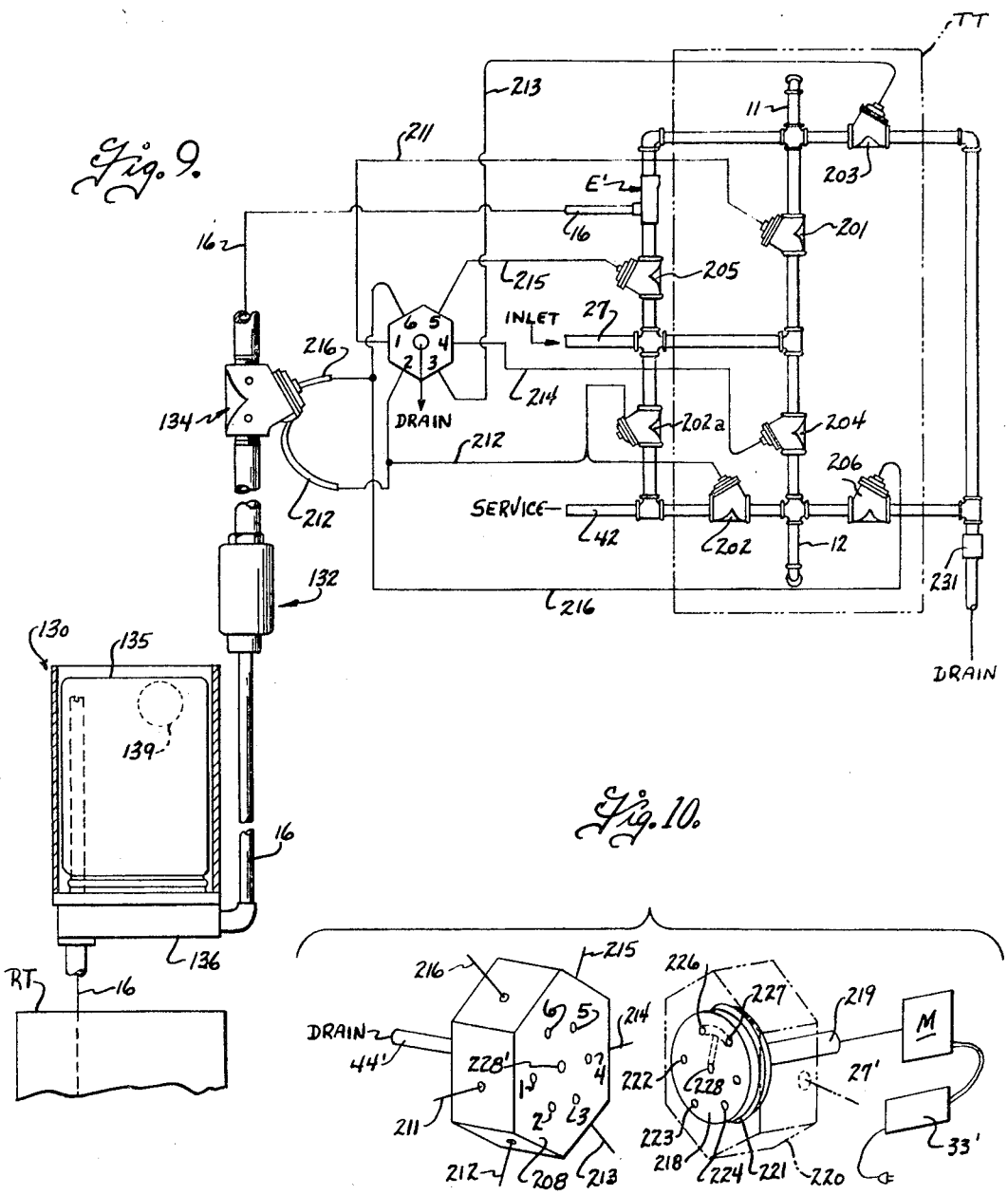

United States Patent Office 3,467,255
Patented Sept. 16, 1969

3,467,255
REGENERANT CONTROL APPARATUS
Robert A. Whitlock, Rockford, Ill., assignor to Aqua-Matic Inc., Rockford, Ill., a corporation of Illinois
Filed Nov. 21, 1967, Ser. No. 684,658
Int. Cl. B01d 33/38, 25/30, 23/20
U.S. Cl. 210—105
17 Claims

ABSTRACT OF THE DISCLOSURE

A fluid treatment system which includes a treatment tank, regenerant tank, and ejector. A main valve apparatus controls various flows through the system, and a timer provides timed control of the positions of the main valve apparatus. A regenerant control apparatus is interposed in the regenerant line to control flow in both directions therethrough and is operative to prevent the drawing of air by the ejector, to regulate the rate of flow during refill, and to limit the refill so that the amount of refill is generally constant irrespective of fluid pressures.

Background.—This invention pertains to the field of control systems for fluid treatment apparatus of the type having a treatment tank containing a bed of exchange material and a regenerant tank for periodically regenerating the exchange material.

It has been found desirable to eliminate any small moving parts in the regenerant tank. In particular, valving arrangements in the regenerant tank, for example, float-controlled valves, are continuously subject to corrosion by the regenerant fluid or brine which considerably reduces the life of the valve mechanism. Should the float stick or the valve fail to seat, the brine tank can malfunction, for example, it may overflow with resultant possible product liability.

Summary.—The present invention relates to improvements in control systems for fluid treatment apparatus and more particularly to a system having an improved apparatus for controlling both the inflow and outflow of the regenerant tank.

An important object is to provide a control system for fluid treatment apparatus having an improved regenerant control apparatus which can be located outside the regenerant tank.

Another object of this invention is to provide a control system for fluid treatment apparatus having a regenerant control apparatus for controlling the flow of a pre-selected quantity of fluid to refill the regenerant tank.

Still another object is to provide a system in accordance with the foregoing object which also controls the flow of regenerant fluid to the treatment tank.

These, and other objects and advantages of the invention, will be more readily appreciated as the invention becomes better understood by reference to the following description and the accompanying drawings.

DRAWING

FIGURE 1 is a diagrammatic view of one form of control system and illustrating the port and passage arrangement as seen from a top view of the stator of the stator of the multiport valve;

FIG. 2 is a partial vertical sectional view through the multiport valve and on a slightly larger scale;

FIG. 3 is a plan view of a rotor adapted for use with the valve of FIG. 2;

FIG. 4 is a fragmentary vertical sectional view through the stator and rotor;

FIG. 5 is a vertical sectional view through the regeneration flow controller taken generally along broken line 5—5 of FIG. 6 and on a larger scale than FIG. 1;

FIG. 6 is a sectional view taken along line 6—6 of FIG. 5;

FIG. 7 is a view similar to FIG. 5 but illustrating some parts of the regeneration flow controller in a moved position;

FIG. 8 is a diagrammatic view of another form of control system utilizing the multiport valve of FIG. 1 with another regeneration flow control apparatus;

FIG. 9 is a diagrammatic view of still another form of system utilizing the regeneration flow control apparatus of FIG. 8 with another valving apparatus; and FIG. 10 is an exploded diagrammatic view of the controls utilized with the system shown in FIG. 9.

DESCRIPTION

A fluid treatment apparatus employing the control system of the present invention includes a treatment tank TT containing a bed of exchange material and has an in let line 11 communicating therewith adjacent the top and a treated fluid outlet line 12 adjacent its other end. The regenerating material used in the periodic regeneration of exchange material in the tank TT, is contained in a regenerant tank RT. The tank RT has a regenerant line 16 connected thereto to convey regenerant fluid or brine from the tank RT and to convey fluid into the tank RT to refill the same. Regenerant line 16 extends to a point adjacent the bottom of tank RT and is conveniently provided with a well point (not shown) having 0.014 inch slots to prevent solid regenerant material from entering the system. However, regenerant dissolved in fluid can freely enter the regenerant line.

The control system for the fluid treatment apparatus includes a main valve means operable in various positions to control the various flows of fluid to and from the treatment tank TT, an ejector E for drawing regenerant from the regenerant tank, a regenerant control apparatus RC which is operable to control the flow in the regenerant line 16, and a timer controlled apparatus for operating the main valve means through the successive phases of the regenerant cycle. In general, the regenerant control RC is operable to control flow in both directions through the regenerant line 16 including terminating the flow of regenerant fluid when the fluid drops to a preselected level and operating under control of the timer controlled apparatus to time the refill of the regenerant tank.

In accordance with the present invention, the apparatus for controlling the various flows of fluid to and from the regenerant tank RT and treatment tank TT may be embodied in a single multiport valve designated generally by the numeral 18. In general, the valve 18 includes a stator 19, a rotor 21 and an operating mechanism 22 for selectively turning the rotor between service, backwash, regenerant and rinse positions. The operating mechanism may be of any suitable construction and is herein illustrated as the lift-turn type disclosed in Patent No. 2,833,309, to Paul G. Bird, and reference is made thereto for a more complete description.

Briefly, the operating mechanism for the rotor includes a diaphragm 23 non-slidably and rotatably connected to the stem 24 on the rotor and arranged to lift the stem and rotor when the pressure at the underside of the diaphragm exceeds the pressure at the upper side thereof. The operating mechanism returns the rotor to its seated position when the pressure at the upper side of the diaphragm is equal to, or greater than, the pressure at the underside thereof. A cam 25 and follower 26 are provided on the stem and bonnet of the valve, respectively, to turn the rotor from one position to the next succeeding position in response to raising and lowering of the stem. A fluid supply line 27 is connected to a raw fluid inlet passage 28 and communicates with the underside of the diaphragm 23. A restricted passage 29 communicates with the inlet passage 28 and with the chamber above the diaphragm 23 to supply fluid at line pressure to the upper side of the diaphragm. A drain conduit 31 also communicates with the chamber at the upper side of the diaphragm and has a valve 32 therein adapted, upon opening, to pass the fluid in the chamber above the diaphragm to drain at a rate faster than the rate of flow through the restricted passage 29 to thereby reduce the pressure at the upper side of the diaphragm and raise the rotor. When the drain valve 32 is closed, the fluid enters the chamber above the diaphragm through the passage 29, thereby equalizing the pressures at opposite sides of the diaphragm and effecting reseating of the rotor. Cam 25 is operative during raising and lowering of the rotor, to turn the rotor from one position to the next succeeding position. While a specific form of valve operating mechanism is herein disclosed and described, it is apparent that various other operating mechanisms may be employed for turning the rotor between successive positions. In accordance with the present invention, the valve is time controlled by a timer 33 which is operatively connected to a solenoid 34 to periodically energize the latter and effect time controlled opening and closing of valve 32 and thereby step the multiport valve between its successive positions.

The stator 19 includes a passage 35 which is connected to the inlet line 11 of the treatment tank TT and a passage 37 connected to the outlet line 12. A passage 41 is connected to a service line 42 and a central drain passage 43 (see FIG. 2) is connected to a drain line 44. A passage 38 (see FIG. 4), hereafter sometimes called a control passage, is connected to a conduit or passage means 39. Conduit 39 has its other end connected to a regenerant control apparatus, generally designated RC, interposed in the regenerant line 16 to control flow therethrough. The face of the stator 19 has a plurality of ports communicating with the various passages in the stator, and the rotor 21 is provided with a plurality of ports and passages adapted to register with the ports in the stator, in the different rotative positions of the rotor, to establish the different flows to and from the treatment tank TT. In the illustrated valve 18, a pair of ports 45 and 46 are provided in the stator and communicate with the passage 35 leading to the inlet line 11 of the treatment tank, and a pair of ports 47 and 48 in the stator are arranged for communication with the passage 37 leading to the outlet line 12. A port 49 communicates with the service passage 41, and a central drain port 50 communicates wtih the central drain passage 43.

An ejector indicated generally by the letter E (see FIG. 1) is conveniently provided in the stator 19. The ejector may be of any construction well known to those skilled in the art and, in general, includes a raw fluid inlet 51, an outlet 52, and a regenerant inlet chamber 55 intermediate the raw water inlet 51 and the outlet 52. Chamber 55 has a port 55a adapted for connection to regenerant line 16. An inlet passage 56 is formed in the stator adjacent one end of the raw fluid inlet 51 and communicates with a port 57 in the face of the stator. When the rotor 21 passes fluid to port 57 in the regenerant position, as hereafter described, a stream of raw fluid is passed through inlet 51 thereby producing a low pressure in chamber 55 to draw regenerant fluid through the line 16 during regeneration of treatment tank TT. Refill of the regenerant tank is also accomplished through the ejector E as will be described.

The rotor 21, illustrated in FIG. 3 includes a pair of angularly spaced ports 65 and 66 adapted to register with the stator ports 45 and 46, when the rotor is in its service position, to pass raw fluid from the supply passage 28 to the inlet line 11 of the treatment tank. A circumferentially extending channel 64 is provided in the rotor and arranged to communicate the stator ports 47 and 49 with each other when the rotor is in service position, to thereby pass the treated fluid from the tank TT to service line 42. A radially extending channel 67 is provided on the rotor and has its inner end communicating with the central drain port 50. A port 68 (see FIGS. 3 and 4) communicates with channel 67 and overlies control passage 38 in the service position, thereby communicating conduit 39 to drain.

The rotor is arranged to be rotated in a clock-wise direction approximately 90° from its service position to a backwash position. In this position, the rotor port 66 communicates with the stator port 47 and passes fluid from the supply line through the line 12 into the bottom of the treatment tank to flow upwardly therethrough and effect backwashing of the exchange material. In this position, channel 67 overlies stator port 46, and a port 67a is provided in the base of the channel to communicate stator port 46 with central drain port 50 to pass the effluent from the top of the treatment tank to the drain. A port 69 is provided in the rotor to pass raw fluid to service during the backwash phase of the regeneration cycle, if desired. Another rotor port 72 overlies control passage 38 in the backwash position and provides fluid under pressure to conduit 39. In the backwash position of the rotor, all of the other ports in the stator are blocked so that no flow occurs therethrough.

The rotor is arranged to be rotated approximately 90° from its backwash position to a regenerant position. As stated above, the rotor is arranged to pass fluid through the port 57 in the regenerant position. For this purpose, a rotor port 74 (see FIG. 3) is provided. In the regenerant position, the rotor blocks flow through the ports 45 and 46 so that the pressure at the outlet 52 of the ejector is less than the pressure at the inlet 51 whereby fluid flows through the ejector. A rotor port 76 overlies control passage 38 in the regenerant position to supply fluid under pressure to conduit 39 and hold the regeneration control RC in open position as hereafter described. When open, fluid can flow through line 16, and the passage of the fluid through the ejector draws the regenerant fluid from the regenerant tank. A port 77 is provided in the rotor to pass raw fluid to service during the regeneration phase of the cycle.

The rotor is adapted to be turned 90° from the regenerant position to a rinse position. In this position, rotor port 74 communicates with stator port 45 to pass raw fluid from the supply line to the top of the treatment tank and effect rinsing of the same. Another port 67b communicates the radial drain passage 67 with the stator port 48 to pass the effluent from the treatment tank to drain. Another rotor port 78 overlies control passage 38 in this position to maintain the regenerant control apparatus RC in its open position. Fluid passed through port 45 can then flow back through the outlet 52 of the ejector and into regenerant line 16 to refill the regenerant tank. Since the timing means 33 controls the amount of time that the rotor is in the rinse position, the refill of the regenerant tank is timed.

A particularly advantageous form of the regeneration control apparatus RC is illustrated in FIGS. 5–7 and in general, includes a casing 80 which defines a flow passage. At one end of the flow passage is a threaded port 82 adapted to be connected to the regenerant tank portion of line 16, and at the other end of the flow passage is a similar threaded port 84 adapted to be connected to the ejector portion of regenerant line 16. In this embodiment, the flow passageway includes an upright cylindrical float chamber 86. An insert 87 in the casing defines a first port 88 at the lower end of the float chamber. A float member 90, conveniently in the form of a buoyant ball, is disposed in the float chamber and cooperates with the port 88 to block flow to the ejector when the liquid in the float chamber drops to a preselected lower level. In this manner, the float chamber 86 and float member 90 advantageously provide an air check. A gasket 92, conveniently made of rubber, is inserted at the upper end of the float chamber and defines a second port 94. The first and second ports are advantageously coaxial with the chamber.

An internal member, generally designated 100, is disposed in the float chamber and has a length less than the length of the chamber. Member 100 includes a generally cylindrical inner body 101 having a flow controller 102 at the upper end thereof. The flow controller is preferably of the pressure-responsive type which will maintain a substantially constant rate of flow with varying pressure conditions. The illustrated flow controller 102 is conveniently of the type disclosed in Patent No. 2,454,929 to Leslie A. Kempton, and reference is made thereto for a more complete description. In general, member 100 has a port 100a at the upper end of body 101, and the flow controller 102 is mounted at the port 100a. The flow controller is conveniently held in place by a ring 102a and an insert 102b having a press fit with the body 101. The upper end of cylindrical portion 101 is tapered to cooperate with port 94 when the internal member 100 is in its upper position shown in FIG. 7, so that all of the flow through the regenerant control passes through the flow controller when the regenerant tank is being refilled. In this manner, the flow controller is operative to control the refill of the regenerant tank. The cylindrical portion 101 has a plurality of ports 104–107 to direct the flow to the flow controller 102. A disk 108 is inserted into the cylinder at a level below the ports to limit the buoyant ball 90 and prevent blocking the flow controller. A plurality of legs 111–114 having a length less than the length of the float chamber, provide a cage for the ball 90 to approximately center the same for seating with port 88. The legs also limit the movement of the member 100 and thus the movement of the flow controller 102 away from port 94, as shown in FIG. 5. In observing FIGS. 5 and 7, it can be seen that the internal member 100 is movable in its entirety from the normal position shown in FIG. 5 to an upper position seated with the second port when the regenerant tank is being refilled.

Insert 87 also defines a third port 116 at the lower side thereof, and a pressure-responsive valve, advantageously of the diaphragm type, is provided for selectively blocking flow in either direction through the port. In the embodiment illustrated, the diaphragm valve is advantageously mounted on the casing 80 and includes a movable wall or diaphragm 121, a valve element 122 for overlying the third port 116, and a valve stem 123 connecting the valve element with the diaphragm. A first pressure chamber 124 is provided on one side of the diaphragm and is connected to control conduit 39 to receive fluid under pressure therefrom. A second pressure chamber 125 is provided on the other side of the diaphragm 121, and a passageway 126 is provided through the valve stem to communicate the second pressure chamber 125 with the pressure in the ejector portion of regenerant line 16.

As stated above, the control passage 38 is communicated with drain during the service position of valve 18. In this manner, the first pressure chamber is relieved to atmosphere, and the pressure in the second pressure chamber 125 moves the valve element 122 to the closed position illustrated in FIG. 5. In the backwash position, pressure is applied to the control passage; however, since the pressures in chambers 124 and 125 are balanced, valve element 122 remains in the closed position. Thus, no flow can occur through the regenerant controller during the service and backwash positions.

As stated above, pressure is applied to the control passage 38 during the regenerant and rinse positions. At the beginning of the regenerant position, the ejector reduces the pressure in the regenerant line 16, as explained above, thereby reducing the pressure in chamber 125 and moving the element 122 to open position, as illustrated in FIG. 7. At this point, then, the regenerant fluid is withdrawn from the regenerant tank RT, and flow continues to the ejector until the level in the float chambers 86 lowers to a point where the float member 90 seats with port 88 and prevents further flow therethrough. This prevents any air from entering the treatment tank.

During the rinse position, which is the position of the valve 18 until it reaches service position, fluid flows back through the ejector, as explained above. Because of this flow, pressure is applied to second chamber 125; however, since the pressures in chambers 124 and 125 are balanced, valve element 122 remains in the position illustrated in FIG. 7 until the control passage is vented to drain. During refill of the regenerant tank, ball 90 floats away from the port 88 and the internal member 100 assumes its upper position illustrated in FIG. 7. This brings the flow controller into operation to regulate the quantity of flow back into the regenerant tank. Since the timing mechanism 33 controls the time that the valve 18 is in rinse position, a substantially constant amount of fluid will be passed into the regenerant tank regardless of the fluid pressure.

Referring now to FIG. 8, a slightly modified control system is shown. In general, the valve 18, the treatment tank TT, the regenerant tank RT, and the connecting lines are the same as those illustrated in FIG. 1 and are designated by the same numerals or letters. In this embodiment, an air check 130, a flow controller 132, and a pressure-responsive valve 134 are separately interposed in the regenerant line 16. The air check 130 includes a container 135 threaded into a body 136 and seated on an O-ring 137. The body is inclined downwardly to a port 138 against which a buoyant ball 139 can seat when the fluid in the container 135 drops to a preselected level. The flow controller 132 includes a housing 141 in which is disposed a flow control member 142 conveniently of the type disclosed in the aforementioned patent to Kempton No. 2,454,929. The member 142, during refill of the regenerant tank RT, seats over a port 144 to control flow therethrough. The member 142, when regenerant fluid is being withdrawn by the ejector, moves to a second position away from port 144 to allow generally unrestricted flow through the regenerant line 16. A screen 145 is conveniently disposed in the housing 141 to limit the movement of the member 142. The pressure-responsive valve 134 is preferably of the diaphragm type such as that previously described. In this embodiment, however, the second pressure chamber is communicated with the ejector portion of regenerant line 16 by means of an external conduit 149 which has one end communicating with the second pressure chamber and the other end communicating with the inside of the valve at a point adjacent its connection to the ejector portion of the regenerant line.

Turning now to FIGS. 9 and 10, there is illustrated another modification of the present invention. In general, the control system illustrated includes the aforesaid supply line 27, service line 42, and drain line 44. Also included are the treatment tank TT having upper and lower connecting lines 11 and 12, and regenerant tank RT having a regenerant line 16 leading to an ejector E'. Ejector E' is mounted separately in this embodiment; however, the internal details may be the same as those illustrated for ejector E, or may be of any convenient form known to those skilled in the art. Interposed in regenerant line 16 are the aforementioned air check 130, flow controller 132, and pressure-responsive valve 134. Further description of these portions of the system of FIGS. 9 and 10 is deemed unnecessary. The main valve means of this embodiment includes a plurality of normally open diaphragm valves 201–206 and a pilot valve generally indicated by the letter P. The pilot valve includes a stator 208 having ports 1–6 in the face thereof. These ports communicate with passageways to which are connected lines 211–216, respectively, leading to normally open diaphragm valves 201–206. When pressure is applied to the ports 1–6, the corresponding diaphragm valve is moved to its closed position and when pressure is relieved to drain, the valves move to their open position. A rotor 218 is mounted on shaft 219 which is driven by motor M and controlled by timing mechanism 33'. In the face of the rotor 218 are a plurality of ports which are arranged to communicate with ports 1–6 in the stator, applying pressure to four of the ports and relieving two of the ports to drain. As shown, rotor 218 is included in a stationary housing 220 to which is connected an auxiliary inlet line 27' to feed fluid under pressure thereto. An O-ring 221 seals the rotor with the housing 220 to prevent leakage of the fluid. Ports 222–225 are fed fluid from the housing, thereby feeding fluid under pressure to four of the six ports in the stator. The other two rotor ports 226 and 227 are communicated with a central drain port 228 which communicates with a corresponding centrally located port 228' in the stator connecting to auxiliary drain line 44'.

In the service position, pressure is applied to ports 3–6 while ports 1 and 2 are relieved to drain. In this manner, valves 201 and 202 are opened, thereby allowing flow from the supply line 27, through top line 11, to the treatment tank; and out through line 12 to the service line 42. In the backwash position, pressure is applied to ports 1, 2, 5, and 6 to close the same; while ports 3 and 4 are vented to drain. Thus, valves 203 and 204 are opened, feeding fluid from the supply line 27 to the bottom of the treatment tank and from there to drain 44. During the regenerant position, pressure is applied to ports 1–4 while ports 5 and 6 are vented to drain. Thus, valves 205 and 206 are opened, feeding fluid from the supply line 27 to the top of the treatment tank and therethrough to drain line 44 through bottom connecting line 12. The flow through the ejector E' draws the regenerant fluid as previously described. In the rinse position, pressure is applied to ports 2–5, while ports 1 and 6 are vented to drain. In this manner, valves 201 and 206 are opened, passing fluid from the supply line 27 to the top of the treatment tank and from the bottom of the treatment tank to drain line 44. In general, the pilot valve is of the type disclosed in Patent No. 2,243,815 to Donald G. Griswold, and reference is made thereto for more complete description.

If desired, a seventh normally closed diaphragm valve 202a may be utilized to bypass fluid from the supply line 27 to the service line 42 in all positions except the service position. A flow restrictor 231 may be interposed in the drain line 44 if desired.

As shown in FIG. 9, pressure-responsive valve 134, interposed in regenerant line 16, has its first pressure chamber connected to control line 212 and its second pressure chamber connected to control line 216. In this manner, pressure is applied to the second pressure chamber during the service position while the first pressure chamber is vented to drain. Thus, the valve 134 is closed during service position. During backwash position, pressure is applied to both pressure chambers; however, since the pressures are balanced, the valve remains in closed position. During the regenerant position, pressure is applied to the first pressure chamber while the second pressure chamber is vented to drain, thereby causing the valve 134 to open, allowing regenerant fluid to be withdrawn from the regenerant tank as previously described. The same condition exists in the rinse position with the valves being open and permitting refill of the regenerant tank back through the ejector E' since valve 201 is also open.

It is now deemed obvious that the present invention provides a control system for fluid treatment apparatus having an improved regenerant control which controls the flow of fluid in both directions through the regenerant line. The control system utilizes only the fluid pressure to control opening and closing of the regenerant control and the system shuts off the flow of regenerant to the ejector when the regenerant reaches a preselected level and also times and regulates the refill of the regenerant tank so that a generally uniform quantity is passed thereto.

The invention in its broader aspects is not limited to the specific apparatus shown and described, but departures may be made therefrom within the scope of the accompanying claims without departing from the principles of the invention and without sacrificing its chief advantages.

What is claimed is:

1. In a flow control system for use with a fluid treatment apparatus having a raw fluid supply line, a service line and a drain line and including
 a treatment tank and first and second lines connected thereto;
 a regenerant tank and a regenerant line connected thereto;
 an ejector having a raw fluid inlet, an ejector outlet, and a regenerant inlet connected to the regenerant line;
 main valve means operatively connected to the ejector, the supply line, the service line, the drain line, and the first and second treatment tank connecting lines for controlling flow therethrough;
 said main valve means including valve element means movable to different positions including
  a service position in wich the valve element means is operable to pass fluid from the supply line through the treatment tank to the service line,
  a regenerant position in which the valve element means is operable to pass fluid from the supply line to the raw fluid inlet of the ejector and to pass fluid from the ejector outlet to one of said treatment tank connecting lines,
  and one other position in which the valve element means is operable to pass fluid to the regenerant line to refill the regenerant tank;
 and timer controlled means for controlling the movement of said valve element means between said different positions and operable to control the time during which the valve element means is in said one other position to time refill of the regenerant tank; the improvement comprising:
regenerant control means interposed in the regenerant line between the regenerant tank and the main valve means for controlling the flow of fluid in both directions through the regenerant line and including
 a pressure-responsive flow-control device movable between one position to permit generally unrestricted flow through the regenerant line to the ejector when the valve element means is in the regenerant position and another position to maintain a preselected generally uniform rate of flow through the regenerant line during refill of the regenerant tank,
 and a pressure-responsive valve apparatus movable between a closed position to prevent flow through the regenerant line and an open position to permit flow therethrough and including a valve member, a pressure chamber adjacent the valve member and having an inlet, and a movable wall in the pressure chamber and operatively connected to the valve member;
passage means connected to said pressure chamber inlet and leading to the main valve means;
and said main valve means having means for operatively connecting the supply line with said passage means during the regenerant position and said one other position to supply fluid under pressure thereto and move the pressure-responsive valve apparatus to open position, and for operatively connecting the drain line with said passage means to remove the pressure therefrom during the service position.

2. The combination of claim 1 wherein the regenerant control means defines a float chamber, and including an air check float member in said float chamber operable to close said regenerant line and block flow of regenerant fluid from the float chamber to the ejector when the fluid therein drops to a preselected level.

3. The combination of claim 2 wherein the regenerant control means includes a casing which defines said float chamber, said casing having first and second ports therein, said air check float member being associated with said first port and operable to close the same to close the regenerant line when the fluid in the float chamber drops to said preselected level, and the pressure-responsive flow-control device is in said chamber and adapted to provide a substantially constant limited flow through the second port from the ejector to the regenerant tank to refill the regenerant tank.

4. The combination of claim 3 wherein the float chamber is generally cylindrically shaped and generally upright, the first port is coaxial with the chamber and at the lower end thereof, and the second port is coaxial with the chamber at the upper end thereof; and including an internal member in the chamber and having upper and lower ends and a length less than the length of the chamber, said internal member having the flow-control device mounted at the upper end thereof and means at the lower end for engaging the lower end of the chamber in a normal position outwardly of the first port, said internal member movable in its entirety from said normal position to an upper position seated with the second port when the regenerant tank is refilled, and said air check float member being disposed inwardly of said last-mentioned means and approximately centered thereby.

5. The combination of claim 4 wherein the casing has a third port therein, and the pressure-responsive valve apparatus is operative to block flow through the third port in its said closed position.

6. The combination of claim 1 wherein the main valve means includes a first member having a ported face and flow passages communicating with the ports in said face; one of said flow passages being connected to the drain line; another of said flow passages being a control passage and connected to said passage means; a second member mounted in conforming relation to said ported face; said members movable relative to each other to at least a first and a second position; the second member having means for operatively connecting the supply line with the control passage in said first position and for communicating the control passage with the drain line in said second position; and the members being movable to the first position during the regeneration and to the second position during service.

7. The combination of claim 6 wherein the valve element means include a plurality of pressure-responsive diaphragm valves each operatively connected to two of said lines to control the flow therebetween, a plurality of control conduits each operatively connected to one of the diaphragm valves for admitting and exhausting operating fluid on one side of the respective diaphragm of said one diaphragm valve, the opposite side of the diaphragm being subject to the pressure of fluid in its respective line, said control conduits each being operatively connected to one of said flow passages, and said second member operative to selectively control the application of supply line pressure to the control conduits and to communicate the control conduits with the drain line to selectively open and close the diaphragm valves and thereby effect movement of the valve element to said different positions.

8. The combination of claim 6 wherein other ones of said flow passages in the first member are respectively connected to the service line, the first treatment tank line, the second treatment tank line, and the regenerant line; said main valve means includes a fluid supply chamber at one side of the ported face; said supply chamber being connected to the supply line; the second member comprises a rotor in the supply chamber mounted to be seated in conforming relation with the ported face, unseated therefrom, rotated, and reseated at said different positions; said rotor having different ports therein arranged to register with different ports in said ported face to pass fluid from the supply chamber through said ported face; said main valve means has movable pressure responsive means operatively connected to the rotor for unseating and reseating the same; and said timer controlled means operative to control the application of pressure to said movable pressure responsive means to thereby control the position of the rotor.

9. In a flow control system for use with a fluid treatment apparatus having a raw fluid supply line, a service line, and a drain line and including
   a treatment tank and first and second lines conected thereto;
   a regenerant tank and a regenerant line connected thereto;
   an ejector having a raw fluid inlet, an ejector outlet, and a regenerant inlet connected to the regenerant line;
   main valve means operatively connected to the ejector, the supply line, the service line, the drain line, and the first and second treatment tank connecting lines for controlling flow therethrough;
   said main valve means including valve element means movable to different positions including
      a service position in which the valve element means is operable to pass fluid from the supply line through the treatment tank to the service line,
      a backwash position in which the valve element means is operable to pass fluid from the supply line through the treatment tank to the drain line,
      a regenerant position in which the valve element means is operable to pass fluid from the supply line to the raw water inlet of the ejector and to pass fluid from the ejector outlet to said treatment tank,
      and a rinse position in which the valve element means is operable to pass fluid from the supply line through the treatment tank to the drain line and simultaneously to pass fluid to the regenerant line to refill the regenerant tank;
   and timer controlled means for controlling the movement of said valve element means between said positions and operable to control the time during which the valve element means is in said rinse position to time refill of the regenerant tank; the improvement comprising:
   regenerant control means interposed in the regenerant line between the regenerant tank and the ejector for cotrolling the flow of fluid in both directions through the regenerant line and including
      means defining a float chamber, an air check float member in said float chamber operable to close said regenerant line and block flow of regenerant fluid from the float chamber to the ejector when the fluid therein drops to a preselected level;
      a pressure-responsive flow-control device operable to maintain a preselected generally uniform rate of flow through the regenerant line during refill of the regenerant tank;
      and a diaphragm valve movable between a closed position to prevent flow through the regenerant line and an open position to permit flow therethrough and including a valve member, a first pressure chamber on one side of the diaphragm, a second pressure chamber on the opposite side of the diaphragm, and each pressure chamber having an inlet;
   first passage means having one end connected to the second pressure chamber inlet for supplying fluid under pressure thereto and urging the diaphragm valve element toward closed position during said service and backwash positions;
   second passage means having one end connected to the first pressure chamber and leading to the main valve means;
   and said main valve means having means for operatively connecting the supply line with the second passage means during said regenerant and rinse positions to move the diaphragm valve element to open position.

10. The combination of claim 9 wherein the first passage means has its other end communicating with the portion of the regenerant passage between the diaphragm valve member and the ejector whereby the second pressure chamber is responsive to the pressure in said portion of the regenrant passage.

11. The combination of claim 10 wherein the diaphragm valve includes a valve stem connected to said valve element and the diaphragm, and wherein the first passage means is in the valve stem.

12. The combination of claim 9 wherein the first passage means also leads to the main valve means, and wherein the main valve means has means for operatively connecting the supply line with the first passage means during said service and backwash positions.

13. In a flow control system for use with a fluid treatment apparatus having a raw fluid supply line, a service line, and a drain line and including
- a treatment tank, a first line connected at the top of the treatment tank, and a second line connected at its bottom;
- a regenerant tank and a regenerant line connected thereto;
- an ejector having a raw fluid inlet, an ejector outlet, and a regenerant inlet connected to the regenerant line;
- a multiport valve including a body having a ported face and flow passages communicating with the ports in said face, one each of said flow passages being connected to the respective drain, supply, first and second lines, a supply chamber at one side of said ported face and connected to the supply line, a rotor in the supply chamber and mounted to be seated in conforming relation with the ported face and movable between service, backwash, regenerant, and rinse positions, said rotor having different ports therein arranged to register with different ports in said ported face to pass fluid from the supply chamber through said ported face, said rotor having a channel therein overlying the drain line connecting passage in all said positions, and said rotor channel overlying the first line connecting passage in backwash position and the second line connecting passage in regenerant and rinse positions to operatively connect the respective passages to the drain line;
- and timer controlled means for controlling the movement of said rotor between said positions and operable to control the time during which the rotor is in the rinse position to time refill of the regenerant tank; the improvement comprising:
- regenerant control means interposed in the regenerant line between the regenerant tank and the multiport valve for controlling the flow of fluid in both directions through the regenerant line and including
   - a pressure-responsive flow-control device operable to maintain a preselected generally uniform rate of flow through the regenerant line during refill of the regenerant tank,
   - and a diaphragm valve movable between a closed position to prevent flow through the regenerant line and an open position to permit flow therethrough and including a valve member, a diaphragm operatively connected to the valve member, a pressure chamber on one side of the diaphragm, and said diaphragm operable to move the valve member to open position when pressure is applied to the pressure chamber during regenerant and rinse positions;
- another of said flow passages in the multiport valve being a control passage;
- conduit means having one end attached to the pressure chamber and its other end attached to the control passage;
- said rotor having ports therein overlying the control passage during the regenerant and rinse positions to pass fluid from the supply chamber to said diaphragm valve pressure chamber, and said rotor channel overlying the control passage during service position to connect the same to the drain line and remove the pressure in the diaphragm valve pressure chamber.

14. The combination of claim 13 wherein the regenerant control means includes a float chamber, and an air check float member in the float chamber operable to close the regenerant line and block flow of regenerant fluid from the float chamber to the ejector when the fluid therein drops to a preselected level.

15. The combination of claim 13 wherein the diaphragm valve has a second pressure chamber on the other side of the diaphragm, and means for communicating the second pressure chamber with the portion of the regenerant passage between the valve member and the multiport valve so that the second pressure chamber receives pressure during the service, backwash and rinse positions.

16. In a flow control apparatus for use with a fluid treatment apparatus having a raw fluid supply line, a service line, and a drain line and including
- a treatment tank, a first line connected at the top of the treatment tank, and a second line connected at its bottom;
- a regenerant tank and a regenerant line connected thereto;
- an ejector having a raw fluid inlet, an ejector outlet, and a regenerant inlet connected to the regenerant line;
- main valve means for controlling flow to and from the treatment tank and having valve members movable to different positions including service, backwash, regenerant, and rinse positions, said main valve means including
   - a first diaphragm valve operatively connected to the supply line and to the first treatment tank line, a second diaphragm valve operatively connected to the second treatment tank line and to the service line, said first and second diaphragm valves being open in the service position so that fluid flows from the supply line through the treatment tank to the service line;
   - a third diaphragm valve operatively connected to the first treatment tank line and to the drain line, a fourth diaphragm valve operatively connected to the supply line and to the second treatment tank line, said third and fourth diaphragm valves being open in the backwash position so that fluid flows from the supply line up through the treatment tank to the drain line;
   - a fifth diaphragm valve operatively connected to the supply line and to the raw fluid inlet of the ejector, a sixth diaphragm valve operatively connected to the second treatment tank line and to the drain line, said fifth and sixth diaphragm valves being open in the regenerant position;
   - said first and sixth diaphragm valves being open in the rinse position to pass fluid from the supply line through the treatment tank to the drain line and simultaneously to pass fluid to the regenerant line to refill the regenerant tank,
   - each diaphragm valve being normally open and having a ported pressure chamber on one side of the diaphragm for closing the valve when pressure is applied thereto,
   - and pilot valve means movable between four positions for controlling the application of pressure to four selected diaphragm valves in each position to close the same;
- and timer controlled means for controlling the movement of the pilot valve means between the four positions and operable to control the time the pilot valve means is in the rinse position to time refill of the regenerant tank; the improvement comprising:
- regenerant control means interposed in the regenerant line for controlling the flow of fluid in both directions therethrough and including
  means defining a float chamber, an air check float member in said float chamber operable to close said regenerant line and block flow of regenerant fluid from the float chamber to the ejector when the fluid therein drops to a preselected level;
  a pressure-responsive flow-control device movable between one position to maintain a preselected generally uniform rate of flow through the regenerant line to the regenerant tank, and a second position to permit generally unrestricted flow to the ejector;
  and a regenerant diaphragm valve movable between a closed position to prevent flow through the regenerant line and an open position to permit flow therethrough and including a valve member, a diaphragm operatively connected to the valve member, a first pressure chamber on one side of the diaphragm, a second pressure chamber on the other side of the diaphragm, said diaphragm operable to move the valve member to open position when pressure is applied only to the first chamber and to closed position when pressure is applied only to the second chamber;
first conduit means operatively connected to the first chamber and to the pilot valve means to receive pressure therefrom simultaneously with the application of pressure to said second diaphragm valve;
and second conduit means operatively connected to the second chamber and to the pilot valve means to receive pressure therefrom simultaneously with the application of pressure to said sixth diaphragm valve; whereby the regenerant diaphragm valve is opened in the regenerant and rinse positions of the main valve means and closed in the service and backwash positions thereof.

17. In a fluid treatment apparatus including a supply line; a treatment tank; a regenerant tank for holding a regenerant fluid; a regenerant line connected to the regenerant tank and serving to condut the regenerant liquid from the regenerant tank and to refill the same; an ejector having one inlet connected to the supply line, a second inlet connected to the regenerant line, and an outlet operatively connected to the treatment tank; the improvement comprising:

regenerant control means in the regenerant line for controlling the flow of fluid in both directions therethrough and including a casing defining a flow passage therethrough, said flow passage including a generally upright float chamber, a first seat at the lower end of the float chamber, an air check float member in the float chamber operable to close said first seat and block flow from the float chamber to the ejector when the fluid therein drops to a preselected level, said casing having second and third seats along said flow passage, a pressure-responsive flow-control device movable between one position away from the second seat in the direction of flow to the ejector to permit generally unrestricted flow thereto and a second position in contact with the second seat, said device operable in the second position to maintain a preselected generally uniform rate of flow through the flow passage during refill of the regenerant tank, a valve mounted on the casing and having a valve element in the flow passage, said valve element cooperable with the third seat to block flow through the flow passage in one position and movable to a second position to permit flow therethrough, and timer controlled means for moving the valve element to said second position to permit flow to the ejector and refill of the regenerant tank, said timer controlled means operable to move the valve element to its first position at a preselected time after refill begins, whereby the refill of the regenerant tank is timed and the flow is regulated so that a generally unifrom refill is accomplished irrespective of fluid pressure.

References Cited
UNITED STATES PATENTS

| | | | |
|---|---|---|---|
| Re. 25,979 | 3/1966 | Rose | 210—140 X |
| 2,243,815 | 5/1941 | Griswold | 210—105 |
| 2,937,753 | 5/1960 | Whitlock | 210—105 |
| 3,080,974 | 3/1963 | Rose | 210—140 X |
| 3,146,788 | 9/1964 | Manlstedt et al. | 210—140 X |
| 3,237,640 | 3/1966 | Whitlock et al. | 137—399 |
| 3,278,424 | 10/1966 | Griswold | 210—140 X |

REUBEN FRIEDMAN, Primary Examiner

J. ADEE, Assistant Examiner

U.S. Cl. X.R.

210—140, 190